(12) United States Patent
Paila et al.

(10) Patent No.: US 8,218,545 B2
(45) Date of Patent: Jul. 10, 2012

(54) IMPLEMENTING MULTICASTING

(75) Inventors: Toni Paila, Degerby (FI); Lin Xu, Lempäälä (FI)

(73) Assignee: Nokia Siemens Networks Oy, Espoo (FI)

( * ) Notice: Subject to any disclaimer, the term of this patent is extended or adjusted under 35 U.S.C. 154(b) by 828 days.

(21) Appl. No.: 10/792,092

(22) Filed: Mar. 4, 2004

(65) Prior Publication Data

US 2004/0170188 A1 Sep. 2, 2004

Related U.S. Application Data

(63) Continuation of application No. PCT/FI02/00719, filed on Sep. 6, 2002.

(30) Foreign Application Priority Data

Sep. 7, 2001 (FI) .................................. 20011778

(51) Int. Cl.
*H04L 12/28* (2006.01)

(52) U.S. Cl. ........................ 370/390; 370/312

(58) Field of Classification Search .................. 370/235, 370/389, 390, 395.2, 395.21, 395.3–31, 408, 370/310–350
See application file for complete search history.

(56) References Cited

U.S. PATENT DOCUMENTS

| | | | |
|---|---|---|---|
| 6,182,147 B1 * | 1/2001 | Farinacci ...................... | 709/238 |
| 6,243,758 B1 * | 6/2001 | Okanoue ...................... | 709/238 |
| 6,269,080 B1 * | 7/2001 | Kumar .......................... | 370/236 |
| 6,999,465 B2 * | 2/2006 | McDonald et al. ........... | 370/432 |
| 7,055,027 B1 * | 5/2006 | Gunter et al. ................. | 713/151 |
| 2002/0024956 A1 | 2/2002 | Keller-Tuberg | |
| 2002/0035730 A1 * | 3/2002 | Ollikainen et al. ............ | 725/93 |
| 2002/0073086 A1 * | 6/2002 | Thompson et al. ............ | 707/10 |
| 2002/0102967 A1 * | 8/2002 | Chang et al. .................. | 455/414 |
| 2002/0143951 A1 * | 10/2002 | Khan et al. .................... | 709/227 |
| 2002/0169712 A1 * | 11/2002 | Ginzboorg et al. ............ | 705/39 |
| 2002/0191584 A1 * | 12/2002 | Korus et al. ................... | 370/349 |
| 2003/0061333 A1 * | 3/2003 | Dean et al. .................... | 709/223 |
| 2003/0169708 A1 * | 9/2003 | Harris ........................... | 370/335 |
| 2005/0063352 A1 * | 3/2005 | Amara et al. ................. | 370/338 |
| 2005/0108419 A1 * | 5/2005 | Eubanks ....................... | 709/232 |
| 2005/0283447 A1 * | 12/2005 | Xu et al. ....................... | 705/400 |
| 2006/0203819 A1 * | 9/2006 | Farinacci et al. ............. | 709/238 |
| 2007/0028002 A1 * | 2/2007 | McCanne ..................... | 709/238 |

FOREIGN PATENT DOCUMENTS

WO WO 00/48361 8/2000

OTHER PUBLICATIONS

IEEE Xplore, Cat No. 98EX104, 1998, Information Networking, Yong-Woon Kim et al. "Behaviors of an enhanced transport protocol for multiple multimedia communications".

(Continued)

*Primary Examiner* — Steven H Nguyen
*Assistant Examiner* — Kenan Cehic
(74) *Attorney, Agent, or Firm* — Squire Sanders (US) LLP

(57) ABSTRACT

An arrangement and method for implementing multicasting in IP networks, in which multicast packets are transmitted along a multicast tree from one transmitter through several multicast controllers to several recipients is discussed. In the method at least one multicast tree intended for control messages is generated in the network from a network multicast controller to cell-level multicast controllers. The network multicast controller transmits along the multicast tree control messages to the cell-level multicast controllers. The control messages contain information on the network multicast and a command to connect to the network multicast tree intended for multicasts.

15 Claims, 5 Drawing Sheets

OTHER PUBLICATIONS

Handley M: "Session Announcement Protocol", IETF RFC 2974, Oct. 2000; pp. 1-20.

Handley M. and Jacobson V.: "SDP: Session Description Protocol", IETF RFC 2327, Apr. 1998; pp. 1-44.

* cited by examiner

IMPLEMENTING MULTICASTING

This application is a Continuation of International Application PCT/FI02/00719 filed Sep. 6, 2002 which designated the U.S. and was published under PCT Article 21(2) in English.

FIELD OF THE INVENTION

The invention relates to an arrangement and method for implementing multicasting in IP networks in particular.

BACKGROUND OF THE INVENTION

Multicasting is a method, by which one and the same content can be distributed efficiently to several recipients in a network. In comparison with conventional transmission between two parties, referred to by the abbreviation PTP (point to point), multicasting saves bandwidth, because in IP networks, for instance, packets with an identical content are not transmitted from one source to several recipients over the entire route, but one packet is transmitted from the source and multiplied in the last possible router in the network into as many copies as there are recipients. Thus, this is a PTM (point to multipoint) transmission. This transmission can be simultaneous, contrary to PTP transmission, in which the transmission is to one recipient at a time.

A certain section of the IP address space is reserved for multicast addresses and these addresses are not given as normal IP addresses of devices. A given multicast address belongs to all devices belonging to the group in question. The basic idea in multicasting is that the recipients register to desired groups by using a known protocol (Internet Group Management Protocol, IGMP). Separate multicasting protocols deliver a multicast transmission (UDP-based traffic from one to many) from the sender to the subscribers.

Multicasting is implemented by means of multicast trees. Each multicast sender has a multicast tree. A multicast tree refers to a connection from a sender through different routers and branching off from the routers to each recipient.

The known method for implementing multicasting causes problems in new data networks. This concerns especially networks that comprise unidirectional links. One such network is the multi-bearer network (MBN) that is a network arrangement providing several different network service types for the delivery of data packets. The network comprises a core network that is connected to the Internet or some other public data network and through interface units to different network services, i.e. access networks, such as the cellular radio networks GSM (Global System for Mobile Communication), GPRS (General Packet Radio System) and UMTS (Universal Mobile Telecommunications System), and the broadcast networks DAB (Digital Audio Broadcast) and DVB (Digital Video Broadcast). Of the above networks, the cellular radio networks are bi-directional and the broadcast networks unidirectional.

A subscriber terminal connected to a system through a unidirectional link cannot connect to a multicast transmission organized by using the prior art, because it is unable to transmit anything to the network due to the unidirectional link that has no transmit capability.

BRIEF DESCRIPTION OF THE INVENTION

It is an object of the invention to implement a method and an arrangement implementing the method in such a manner that multicasting is possible in different types of networks that also comprise unidirectional links. This is achieved by a method for implementing multicasting in IP networks, in which multicast packets are transmitted by means of a multicast tree from one transmitter through several multicast controllers to several recipients. In the method of the invention, at least one multicast tree intended for control messages is generated in the network from a network multicast controller to multicast controllers at cell level, the network multicast controller transmits control messages along the multicast tree to the cell-level multicast controllers, and the control messages contain information on the multicast transmission of the network and a command to connect to the multicast tree of the network intended for multicasts.

The invention also relates to an arrangement for implementing multicasting in IP networks that comprises a number of routers transmitting messages of the different components in the network to each other, at least one multicast transmitter that is arranged to transmit multicast packets through a multicast tree to several receivers, a number of cell-level multicast controllers that are arranged to transmit packets to receivers, a multicast controller that is arranged to control the cell-level multicast controllers. In the system of the invention, the network comprises at least one multicast tree intended for control messages from the network multicast controller to the cell-level multicast controllers, the network multicast controller is arranged to transmit control messages along the multicast tree to the cell-level multicast controllers, and the control messages contain information on the multicast transmission of the network and a command to connect to the multicast tree of the network intended for multicast transmissions.

Preferred embodiments of the invention are described in the dependent claims.

One basic idea of the invention is to use multicast trees both for transmitting control data from the multicast controller and for transmitting the actual information from the signal source. Thus in a preferred embodiment, the network has two logically different multicast trees, one for control messages (control announcement tree, CAT) and one for other multicast messages (Internet standard multicast, ISM). Each tree is identified by the IP multicast address of the tree.

The CAT multicast tree transmits control messages from the network multicast controller to the cell-level multicast controllers. The control messages comprise information on the multicast transmission of the network and commands to connect to the multicast tree of the network intended for multicast transmissions. The cell-level multicast controllers of the network connect to the multicast tree intended for the control messages of the network when they connect to the IP network.

The method and system of the invention provide several advantages. In the solution of the invention, each recipient need not separately register as a recipient, but the cell-level multicast controller registers to receive and transmit multicast transmissions in its cell regardless of whether any one of the terminals in the cell has registered as a recipient of the multicast transmissions. This way, a terminal with a unidirectional link, for instance, can receive multicast transmissions even though it cannot transmit a request to the network and thus not register as a recipient of multicast transmissions.

Further, the network multicast controller need not know and exactly identify the cell-level multicast controllers. Therefore, an increase in the number of cell-level multicast controllers does not affect in any way the operation of the multicast controller of the actual network, nor does it cause a scaling problem in the amount of maintenance and configuration data.

BRIEF DESCRIPTION OF THE FIGURES

The invention will now be described in greater detail by means of preferred embodiments and with reference to the attached drawings, in which.

DETAILED DESCRIPTION OF THE INVENTION

Figure 1A:
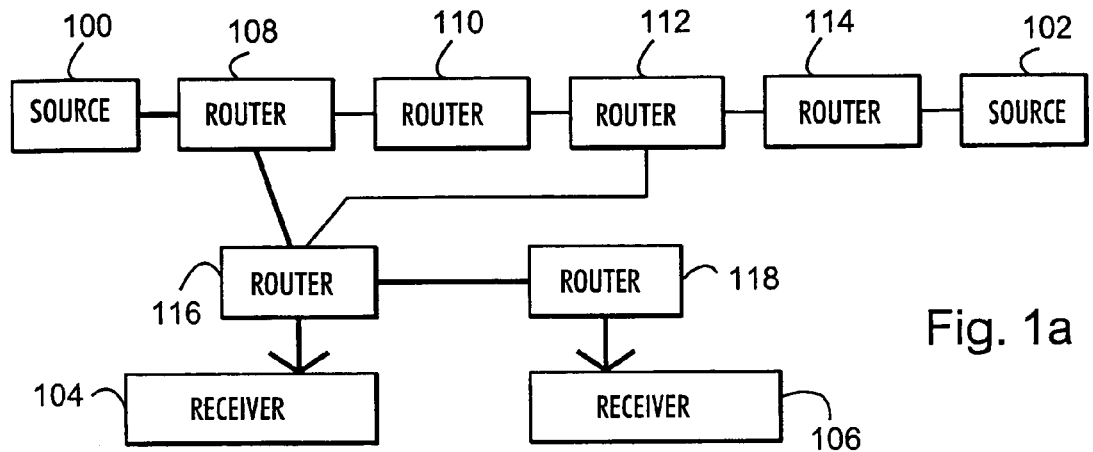
FIGS. 1A to 1C illustrate multicast trees.
Figure 1B:
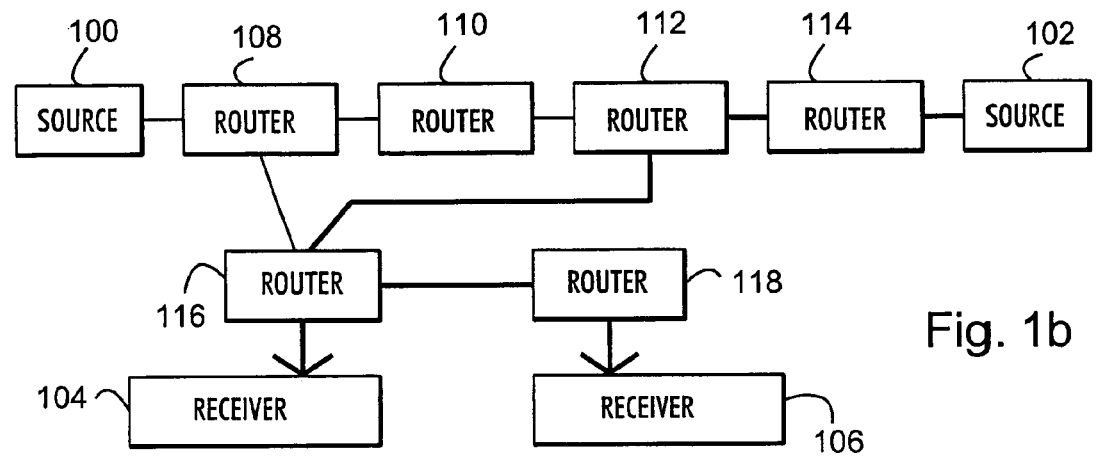
Figure 1C:
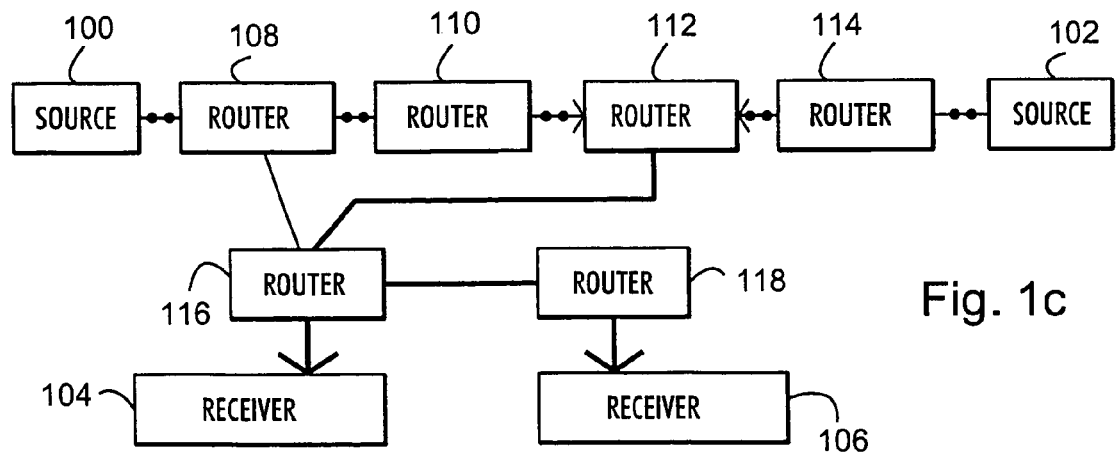

Let us examine the examples of FIGS. 1A to 1C of IP networks and multicast trees. The figures show two multicast transmitters 100, 102, two recipients 104, 106 and a number of routers 108 to 118, through which packets transmitted by the transmitters pass in the IP network. The routers 108 to 118 are, in a way, programmed switches that have a number of input ports and a number of output ports and that following certain predefined rules and using the address fields in the packets transmit the packets from the input ports to given output ports. In principle, there are two types of multicast trees. Shortest path trees, i.e. source trees, are illustrated in FIGS. 1A and 1B. FIG. 1A shows the shortest path through routers from a transmitter 100 to recipients 104 and 106, and FIG. 1B shows the shortest path through routers from a transmitter 102 to recipients. The shortest path tree thus uses a route that runs through as few routers as possible.

FIG. 1C in turn illustrates a shared distribution tree. Here, the transmitters 100 and 102 transmit packets to a certain router 112 by using the shortest path method, and from there onwards, the packets go along a common route. The router 112 is called a rendezvous point RP. From it onwards, the route is divided between the packets of several multicast transmitters. The shortest path method requires more memory, but minimizes the delay in packet propagation. The shared distribution tree in turn uses less memory, but the delay of the packets may be longer, because the route of the packets is not necessarily the shortest possible. The above alternatives are equal for the present invention.

A few multicast methods have been developed for IP networks that can be applied to the preferred embodiments of the invention. Such methods include the protocol independent multicast-sparse mode PIM-SM and protocol independent multicast-dense mode PIM-DM. PIM-SM is designed for networks, in which groups are relatively sparsely situated, and PIM-DM for networks, in which groups are in an area where receivers are relatively densely situated.

Figure 2:
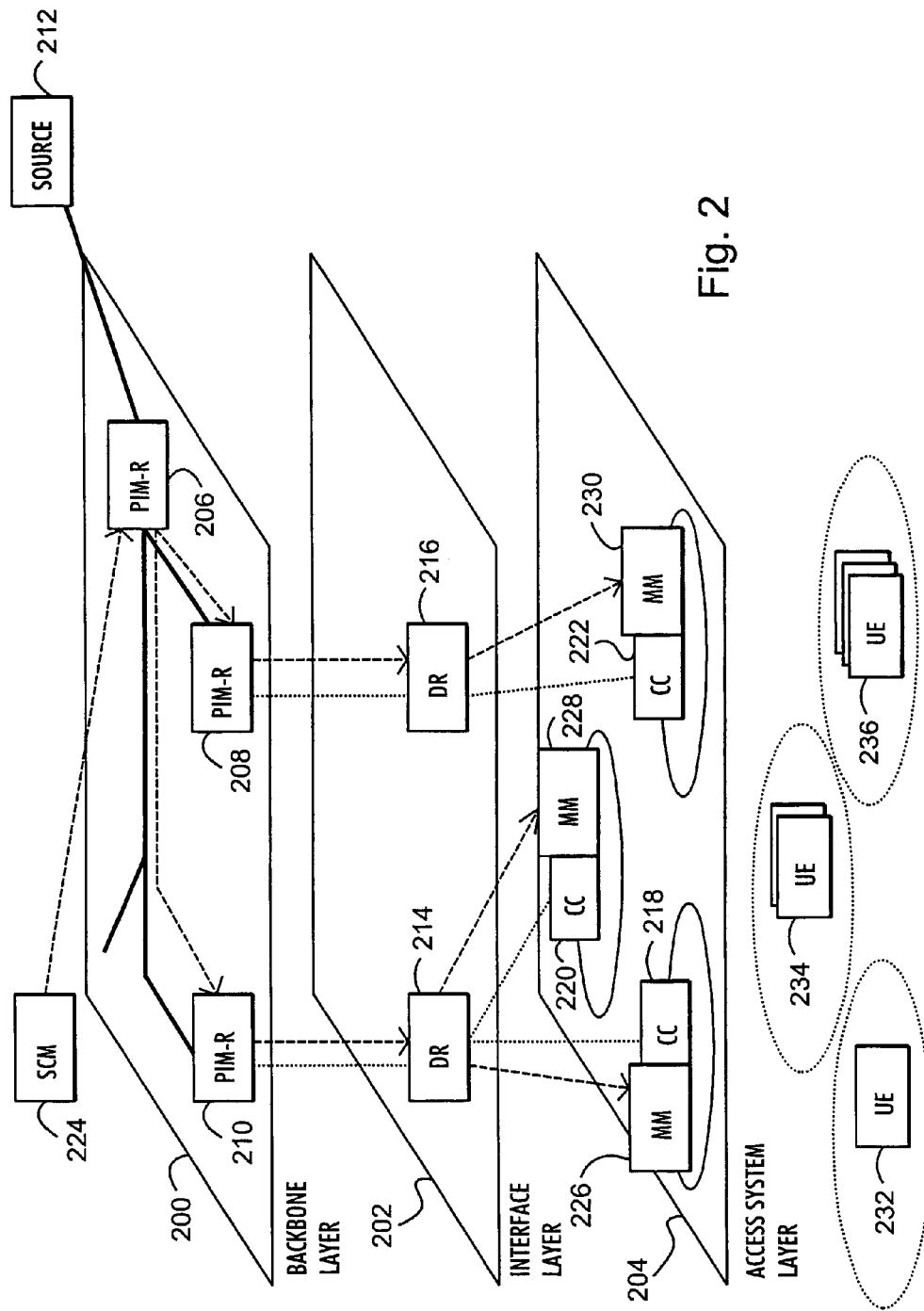
FIG. 2 shows an example of an IP network, to which the solution of the invention can be applied.

Let us then examine FIG. 2 that shows an example of an IP network, to which the solution of the invention can be applied. The network comprises three layers. A backbone layer 200 comprises the backbone of the network or a number of backbones of different networks that are interconnected through routers and that are capable of transmitting packets and generating a multicast tree, i.e. that comprise PIM-SM routers 206 to 210, for instance. An interface unit layer (IU layer) 202 comprises interface functions between the core network and the access network. This layer can also be implemented as a logical layer in such a manner that the interface functions are implemented either in the equipment of the core network or the access network. An access network layer 204 comprises an access network, by means of which users are connected through the core network to IP-based services.

Let us now examine some of the network elements shown in the figure. A multicast source 212 transmits multicast data in packets to the IP network. PIM routers 206 to 210 transmit the multicast packets along the multicast trees from one router to another. Designated routers 214, 216 are connected to one or more cell-level controllers. A designated router is the closest router capable of multicasting to a cell-level controller. A cell-level controller 218 to 222 controls one or more cells in the access network. Depending on the system, a cell-level controller can control all cells in the system, or there may be one controller per cell.

A network multicast controller 224 controls the multicasting of the system. The network multicast controller 224 can thus be a different device than the multicast transmitter 212. Cell-level multicast controllers 226 to 230 are together with cell-level controllers. Both reside in the access network layer. The cell-level multicast controllers keep a record on the active transmissions in a cell. The cell-level multicast controllers connect to the multicast tree intended for the network control messages as described later.

Figure 3:
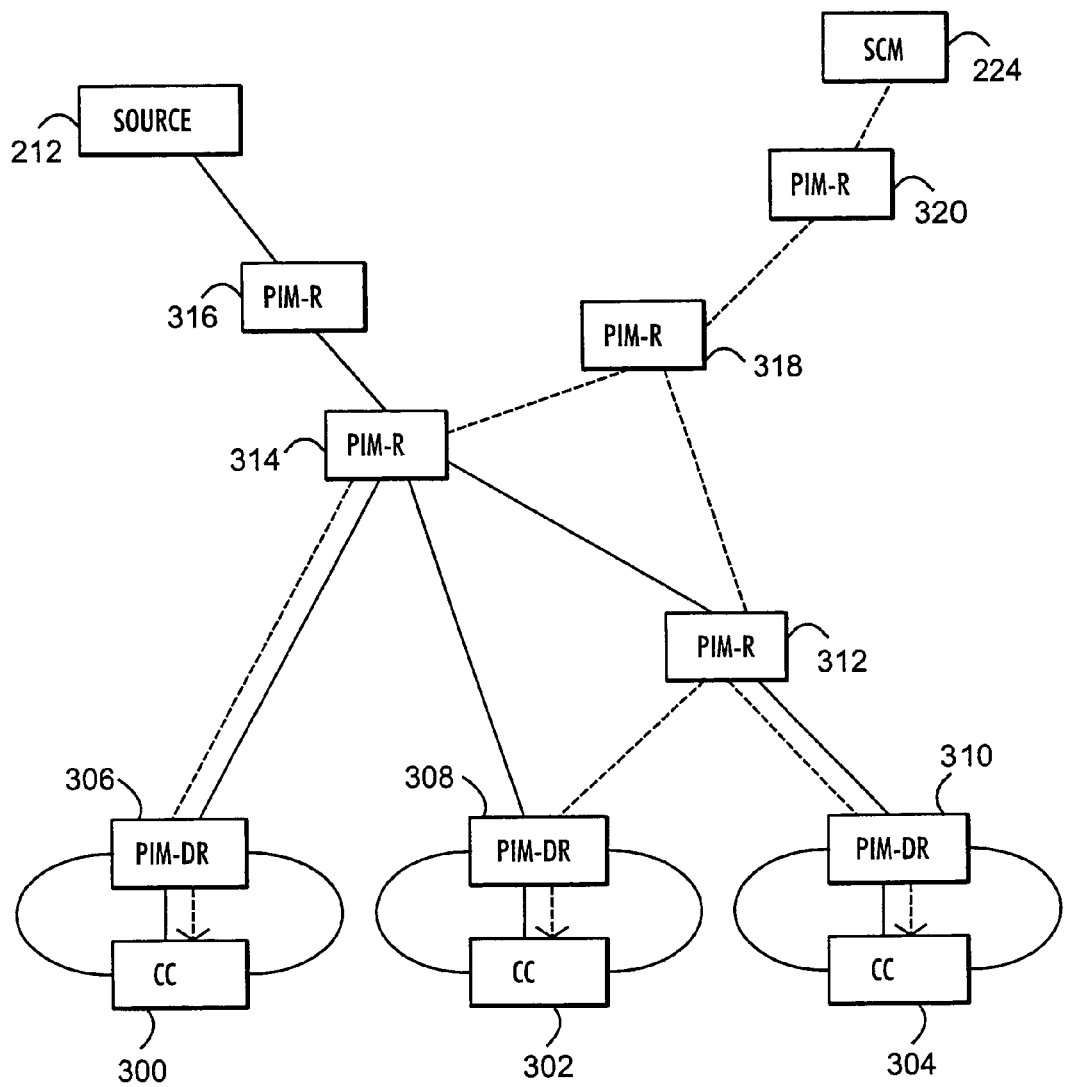
FIG. 3 shows a second example of an IP network.

Let us next examine FIG. 3 that shows an example of an IP network, to which the solution of the invention can be applied, and multicast tree solutions of a preferred embodiment. The figure shows by way of example three cell-level controllers 300 to 304 that herein also comprise cell-level multicast controllers. The cell-level controllers are connected through designated routers 306 to 310 to the rest of the network. In a solution of a preferred embodiment, the network has two logically different multicast trees, one for control messages (control announcement tree, CAT) and one for other multicast messages (Internet standard multicast, ISM). The control message tree ends at the network multicast controller 224, and it is marked with a dashed line in the figure. The multicast tree of the multicast messages ends at the multicast transmitter 212, and it is marked with a continuous line in the figure. As shown in the figure, multicast trees can be different, which is due to the fact that the multicast transmitter 212 and the network multicast controller 224 may reside in different parts of the network.

As mentioned earlier, a certain section of the IP address space is reserved for multicast addresses and these addresses are not given as normal IP addresses of devices. A given multicast address belongs to all devices belonging to the group in question. D-group addresses in the range from 224.0.0.0 to 239.255.255.255 are allocated for multicasting. The address thus identifies the group and not an individual recipient.

Figure 4:
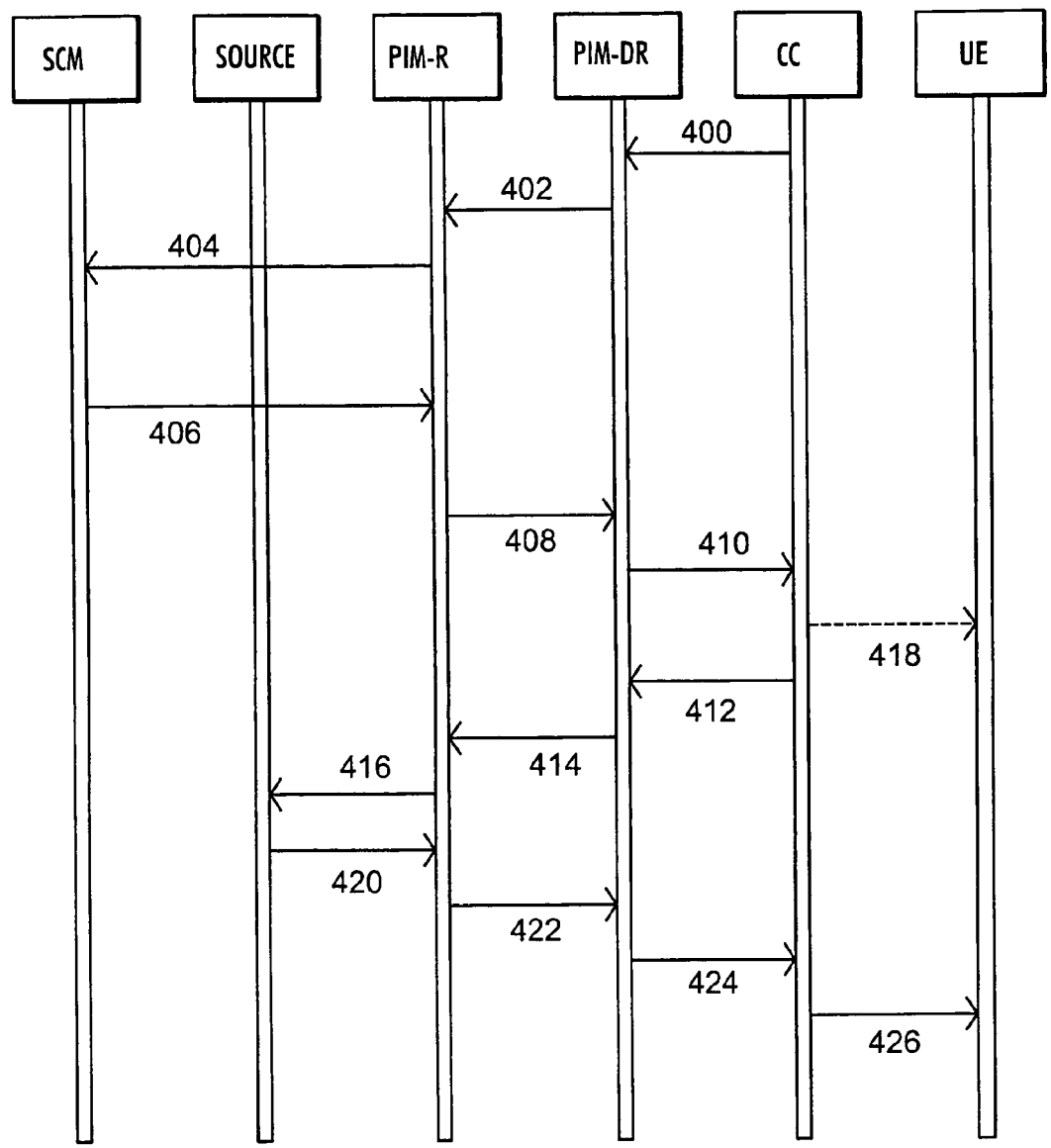
FIG. 4 shows by means of a signal diagram an example of the signalling of IP network components with respect to multicasting.

Let us next examine a solution of a preferred embodiment by means of the signalling diagram of FIG. 4. The diagram shows IP network components and the signalling between them from the viewpoint of multicasting. It is assumed herein that in the first step, the cell-level controller, which comprises a cell-level multicast controller, is connected to the network. The cell-level multicast controller then transmits a message 400 to the closest designated router for the purpose of connecting to the multicast tree intended for network control messages. This occurs regardless of whether the cell-level controller has received any multicast reception requests from the terminals in its cell. The router transmits the message 402, 404 on through PIM routers to the multicast controller. The message route in question becomes a multicast tree from the multicast controller to the cell-level controller. The message of the cell-level controller is transmitted to the multicast controller as IGMP connection messages 400 to 404. IGMP (Internet group management protocol) is a known multicasting protocol.

In the second step, the multicast controller transmits control messages to the control announcement tree (CAT) for cell-level multicast controllers. The messages can be transmitted as SAP notifications, for instance, comprising SDP multicast descriptions. SAP (session announcement protocol) is a known protocol for multicast message transmission and it is described in reference publication Handley M, "Session Announcement Protocol," IETF RFC 2974, October 2000. SDP in turn is a message description that is described in reference publication Handley M and Jacobson V, "SDP: Session Description Protocol," IETF RFC 2327, April 1998. Each CAT is identified by one multicast address, so SAP packets in one multicast tree have the same multicast address. Messages propagate in the multicast tree 406 to 408 until the cell-level controller.

A control message can comprise the following fields:

One or more multicast group identifiers.

A recipient definition filter. Multicasting can for instance be intended for all receivers in a certain area A, or for all receivers with a certain property.

The time during which the information contained in the control message is valid.

Sender authentication.

A request for acknowledgement, if the multicasting defined by the message will not be received.

The multicast group identifier field is obligatory. The other fields are optional. Sender authentication can be arranged with the following generally known method, for instance: the network multicast controller calculates from the control message a standard-length result 'message digest' with a secure hash function. This result is signed digitally with a private key of the network multicast controller. The final result, a message authentication code, is attached to the control message. When a cell-level multicast controller receives a control message, it first separates the authentication code. The code is opened with a public key of the network multicast controller (each cell-level multicast controller has this key or it can easily be obtained, since a public key is public information). Next, the 'message digest' is calculated from the message with the hash function and it is compared with the opened code. If the results match, the control message is authentic (it comes from an authentic source) and whole (it has not changed underway).

In the third step, the cell-level controllers receive the control messages. Depending on the content of the message and the configuration of the cell-level multicast controller, the cell-level controller operates in different ways when receiving a message. The cell-level controller can do the following, for instance:

Register as a multicast recipient to a multicast tree by using an IGMP join command, for instance, 412 to 416.

As above, but in addition it can notify 418 the terminals in the cell that a multicast transmission is available (AVAILABLE) by using an SDP message, for instance.

As in the first alternative, but it can notify 418 the terminals in the cell that the multicast transmission must be received (MUST-LISTEN). The message can be an SDP message, for instance.

It can leave the message unprocessed. This can occur, for instance, if the time indicated in the message has elapsed or if there is no certainty about the sender. Further, if the message indicates that the recipient group has been limited with a filter, and the recipient does not belong to this group, the message is not processed.

In the fourth step, the multicast transmitter transmits multicast packets from the core network to the cells along the multicast tree 420 to 426.

The invention has several different embodiments. For instance, the protocol used for multicasting in the network, with which the multicast trees and messages are transmitted, is not significant. The above-mentioned PIM-SM and PIM-DM protocols, for instance, can be used. There are also several alternatives for the used control protocol, such as SDP over SAP and UDP (User Datagram Protocol) or ICMP (Internet Control Message Protocol). SAP, UDP and ICMP are generally used protocols in IP networks.

Figure 5:
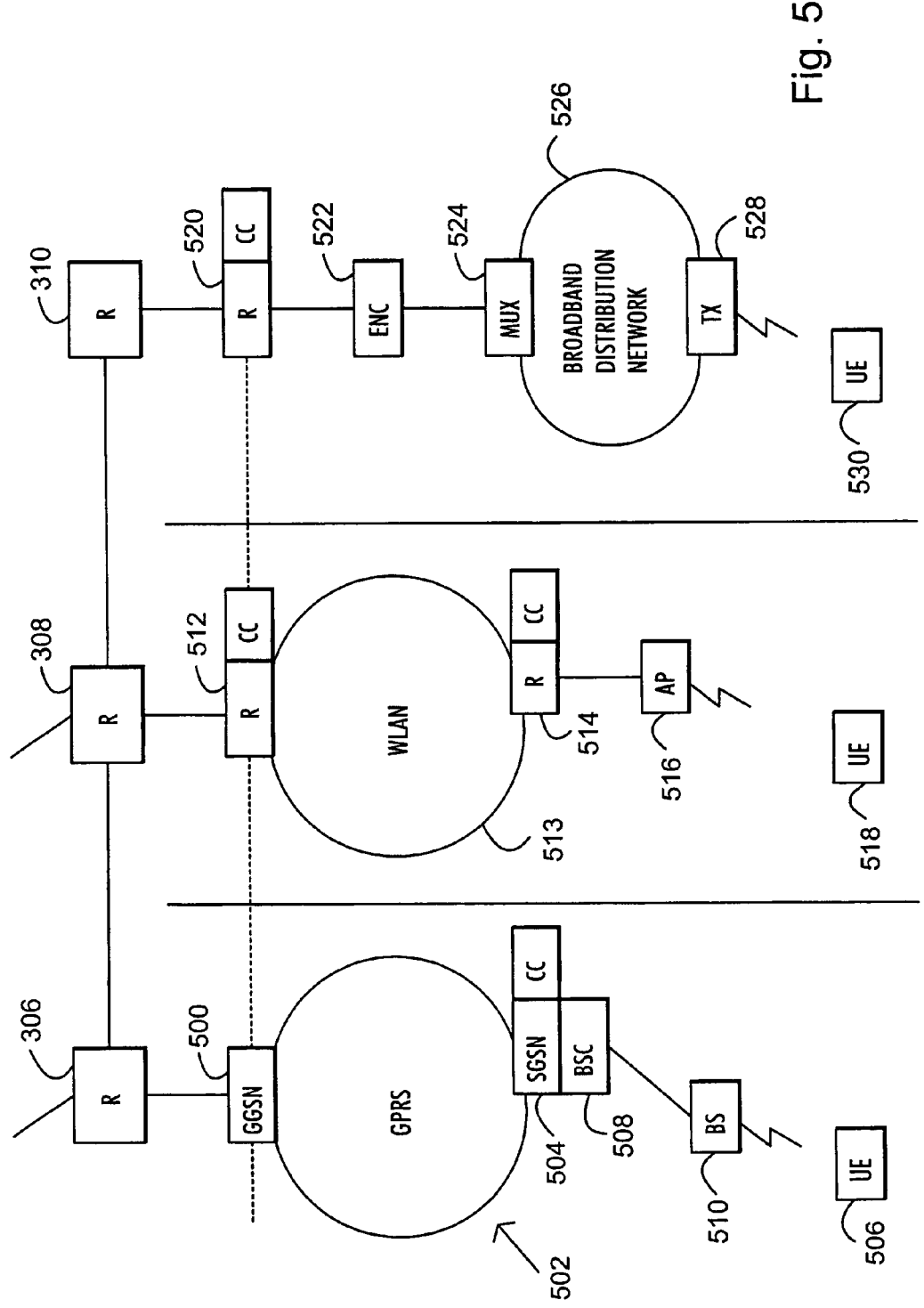
FIG. 5 illustrates different access networks.

FIG. 5 illustrates an IP-based multi-bearer network, to which different access networks are connected. The routers 306 to 310 shown in the figure correspond to the routers in FIG. 3. Router 306 is connected to a gateway GPRS Support node GGSN 500 of the GPRS (General Packet Radio System) network. GGSN 500 routes packets between the GPRS system and the IP network external to it. GGSN further has a connection 502 to a serving GPRS support node SGSN 504. The main task of SGSN 504 is to transmit and receive packets to and from user equipment 506 supporting packet-switched transmission by using a base station system. The base station system comprises a base station controller BSC 508 and a base station BS 510 controlled by it. In this case, the cell-level controller is in SGSN 504.

The router 308 is connected to a WLAN (Wireless Local Area Network) router 512. The router 512 in turn has a connection 513 to a router 514. The router 514 in turn has a connection to an access point AP 516 that has a wireless connection to a terminal 518. In this case, the cell-level controller is either in the router 512 or in the router 514.

The router 310 is connected to a DAB/DVB system router 520. The router 520 is connected to a coder 522, in which the coding required by the system is performed, and the coder is connected to a multiplexer 524, from which a signal is transmitted through an ATM network to the transmitter 528 that transmits the signal on a unidirectional connection to a terminal 530. In this case, the cell-level controller is in the router 520.

The above DAB/DVB description is only one example of a possible implementation. Said network can also be implemented in other ways, such as by having the coder and/or multiplexer in the transmitter 528, whereby the network comprises consecutive routers ending up in the transmitter 528. The cell-level controller then always resides in the penultimate router.

In all the examples described above, the cell-level controller is thus arranged to connect to the multicast tree intended for network control messages when it connects to the IP network. In practice, this feature in the cell-level controller is in most cases implemented by program. There is no need for structural changes in the known cell-level controllers in the preferred embodiment of the invention, but a desired feature can be included in the software of the controller. Correspondingly, the features of the preferred embodiment of the invention can be implemented by program in the multicast controller.

Even though the invention has been explained in the above with reference to examples in accordance with the accompanying drawings, it is apparent that the invention is not restricted to them but can be modified in many ways within the scope of the inventive idea disclosed in the attached claims.

The invention claimed is:

1. A method, comprising:

transmitting multicast data packets in at least one first multicast tree from one transmitter through a plurality of multicast controllers to a plurality of recipients, wherein only unidirectional downlink communication exists between the multicast controllers and the recipients;

generating at least one second multicast tree reserved for control messages in an internet protocol network beginning from a network multicast controller and ending to one or more multicast controllers at cell level; and the cell level multicast controller originates a message to join the second multicast tree, if the join message is received, then transmitting the control messages from the network multicast controller along the at least one second multicast tree reserved for control messages to the at least one multicast controller at cell level, the control messages comprising information on the multicast transmission of a internet protocol network and a command configured to connect to the at least one first multicast tree of the internet protocol network configured for multicasts.

2. A method as claimed in claim 1, further comprising:
connecting, when connecting to the internet protocol network, the one or more multicast controllers at cell level to the at least one multicast tree configured for the network control messages.

3. A method as claimed in claim 1, further comprising:
connecting, after receiving a control message from the network multicast controller through the at least one multicast tree configured for the control messages, the one or more multicast controllers at cell level to the at least one multicast tree configured for multicasts and defined in the control message.

4. A method as claimed in claim 1, further comprising:
transmitting, after connecting to the at least one first multicast tree configured for multicasts, by the at least one or more multicast controllers at cell level, packets received through the one first multicast tree to at least one receiver in a cell.

5. A method as claimed in claim 1, wherein the control messages further comprise information on an identifier of one or more multicast groups.

6. A method as claimed in claim 1, wherein the control messages further comprise information on a time of validity of the control messages.

7. A method as claimed in claim 1, wherein the control messages further comprise information on a sender authentication.

8. A method as claimed in claim 1, wherein the control messages further comprise a receiver filter.

9. A method as claimed in claim 1, further comprising:
registering, after receiving a control message from the network multicast controller, by the one or more multicast controllers at cell level, a recipient of a multicast defined in the control message.

10. A method as claimed in claim 1, further comprising:
notifying, after receiving a control message from the network multicast controller, by the one or more multicast controllers at cell level, recipients of its cell that a multicast is available.

11. A method as claimed in claim 1, further comprising:
notifying, after receiving a control message from the network multicast controller through the at least one multicast tree configured for control messages, by the one or more multicast controllers at cell level, recipients of its cell that a multicast must be received.

12. A method as claimed in claim 1, further comprising:
refraining, after receiving a control message from the network multicast controller through the at least one multicast tree configured for control messages, from processing the control message by the one or more multicast controllers at cell level.

13. An arrangement for implementing multicasting in internet protocol networks, the arrangement comprising:
a plurality of routers configured to transmit different components in the internet protocol networks to each other;
at least one first multicast tree configured to transmit multicast packets through a plurality of multicast controllers to a plurality of recipients, wherein only unidirectional downlink communication exists between the multicast controllers and the recipients;
a plurality of cell-level multicast controllers configured to transmit packets to the plurality of receivers; and
a network multicast controller that is arranged to control the cell-level multicast controllers,
wherein an internet protocol network comprises at least one second multicast tree reserved for control messages and configured to route control messages beginning from the network multicast controller and ending to the plurality of cell-level multicast controllers, wherein the cell level multicast controller originates a message to join the second multicast tree, and if the join message is received, the network multicast controller is then configured to transmit the control messages along the at least one second multicast tree to the plurality of cell-level multicast controllers, and the control messages comprise information on the multicast transmission of the internet protocol network and a command configured to connect to the at least one first multicast tree of the internet protocol network configured for multicast transmissions.

14. An arrangement as claimed in claim 13, wherein the cell-level multicast controllers are configured to connect to the multicast tree configured for network control messages when connecting to the internet protocol network.

15. An arrangement as claimed in claim 13, wherein the cell-level multicast controllers are configured to connect to the multicast tree of the internet protocol network configured for multicasts after receiving a control message from the network multicast controller through the multicast tree configured for control messages.

* * * * *